(12) United States Patent
Hsu et al.

(10) Patent No.: US 7,679,844 B2
(45) Date of Patent: Mar. 16, 2010

(54) LENS HOLDER

(75) Inventors: Mu-Chi Hsu, Taipei Hsien (TW); Guo-Han Yue, Shenzhen (CN)

(73) Assignees: Hong Fu Jin Precision Industry (ShenZhen) Co., Ltd., Shenzhen, Guangdong Province (CN); Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 0 days.

(21) Appl. No.: 12/131,132

(22) Filed: Jun. 2, 2008

(65) Prior Publication Data

US 2009/0168210 A1    Jul. 2, 2009

(30) Foreign Application Priority Data

Dec. 27, 2007  (CN) .................... 2007 1 0203442

(51) Int. Cl.
G02B 7/02    (2006.01)

(52) U.S. Cl. ...................................... 359/819; 359/811

(58) Field of Classification Search ......... 359/694–824; 396/76–79, 83, 103
See application file for complete search history.

(56) References Cited

U.S. PATENT DOCUMENTS

| 4,281,895 A | * | 8/1981 | Mohr ......................... 359/827 |
| 4,544,240 A | * | 10/1985 | Shimizu ..................... 359/702 |
| 7,430,368 B2 | * | 9/2008 | Lee ............................ 396/76 |

* cited by examiner

*Primary Examiner*—Mohammed Hasan
(74) *Attorney, Agent, or Firm*—Zhigang Ma

(57) ABSTRACT

An exemplary lens holder (30) includes a lens holding platform (35), a base (31), a resilient element (33), and three platform supporting members (32). The platform supporting members (32) connect the lens holding platform (35) with the base (31), and are aligned on different axes. The resilient element (33) is positioned between the lens holding platform (35) and the base (31), and configured for uniformly resisting the lens holding platform (35) away from the base (31). One of the three platform supporting members (32) is adjustable, thus adjusting a gradient of the lens holding platform (35) relative to the base (31).

13 Claims, 5 Drawing Sheets

LENS HOLDER

BACKGROUND OF THE INVENTION

1. Field of the Invention

The present invention relates, generally, to lens holders, more particularly to a lens holder used for adjusting the positions of the lens set on the lens holder.

2. Discussion of the Related Art

An optical manufacturing machine such as a laser cutting machine generally includes a light source and a plurality of lenses. The lenses and the light source can cooperatively form an optical system to transmit light emitted from the light source in a predetermined light path. The lenses are mounted to the optical manufacturing machine via a plurality of lens holders.

Referring to FIG. 5, a typical lens holder 10 includes one circular base 11 and three fastening elements 12. The circular base 11 defines a circular depression 112 for holding lenses in a top surface 111 thereof. The circular base 11 defines three mounting holes 113 around the perimeter. The three fastening elements 12 protrude through the three mounting holes 113 correspondingly, and screwed into the optical manufacturing machine.

When the lenses are fixed to the optical manufacturing machine via a plurality of lens holders 10, the lenses and the light source cooperatively form an optical system of the optical manufacturing machine. However, the lens may deviate from the predetermined position because a surface of the lens holder is generally not smooth and limits the machining precision of the lens holders.

Therefore, a lens holder which can overcome the above-described problem is desired.

SUMMARY

An exemplary lens holder includes a lens holding platform, a base, at least one resilient element, and three platform supporting members. The platform supporting members connect the lens holding platform with the base, and are aligned on different axes. The resilient element is positioned between the lens holding platform and the base, and configured for uniformly resisting the lens holding platform away from the base. One of the three platform supporting members is adjustable, thus adjusting a gradient of the lens holding platform relative to the base.

Other advantages and novel features will become more apparent from the following detailed description when taken in conjunction with the accompanying drawings.

BRIEF DESCRIPTION OF THE DRAWINGS

The components in the drawings are not necessarily drawn to scale, the emphasis instead being placed upon clearly illustrating the principles of the present lens holder. Moreover, in the drawings, like reference numerals designate corresponding parts throughout the several views.

DETAILED DESCRIPTION OF THE EMBODIMENTS

Reference will now be made to the drawings to describe preferred embodiments of the present lens holder, in detail.

Figure 1:
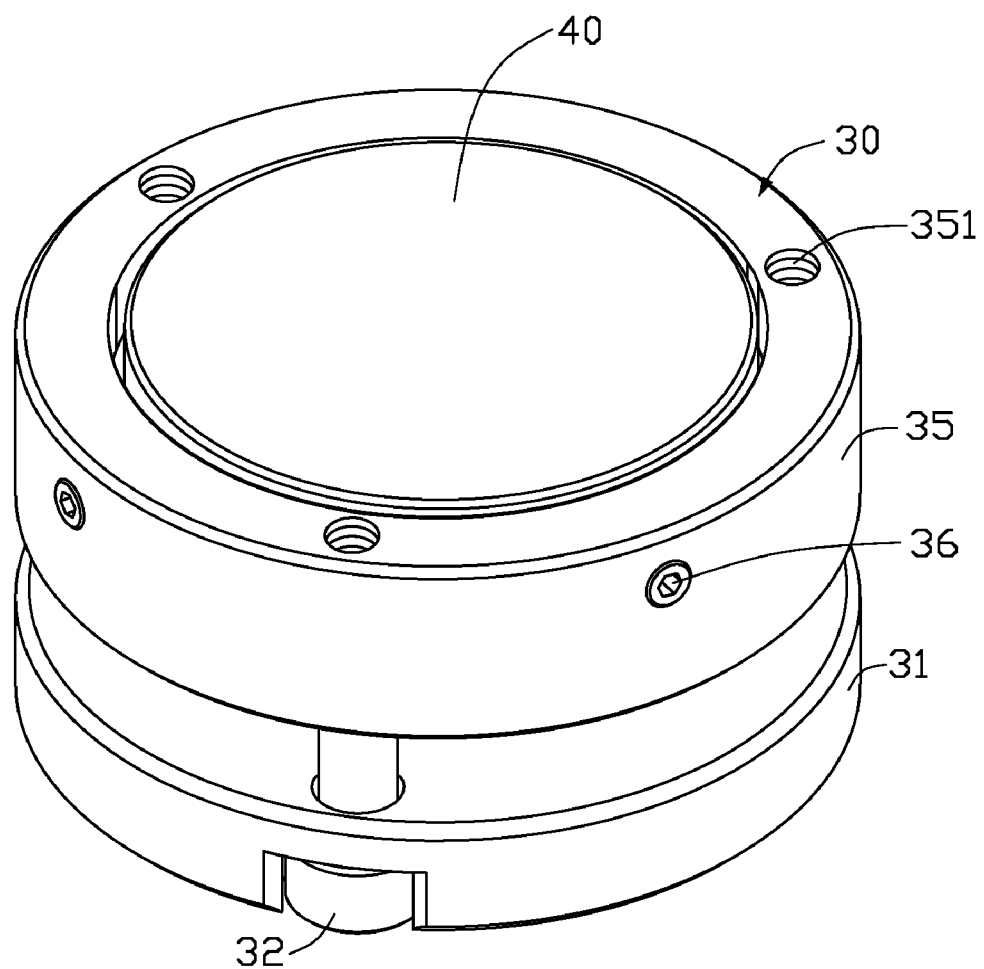
FIG. 1 is an assembled, isometric view of a lens holder in accordance with a first preferred embodiment of the present application with a lens received in the lens holder.
Figure 2:
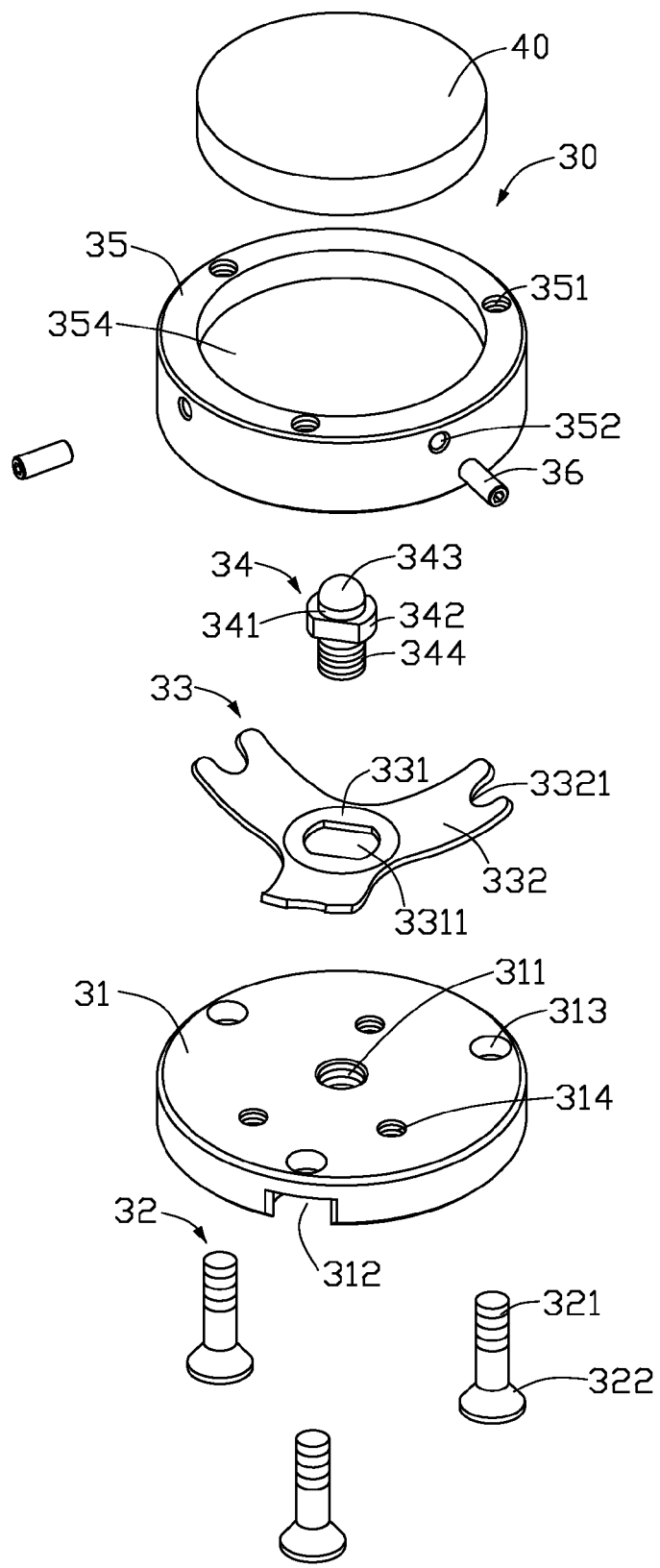
FIG. 2 is an exploded, isometric view of the lens holder of FIG. 1 with the lens.
Figure 3:
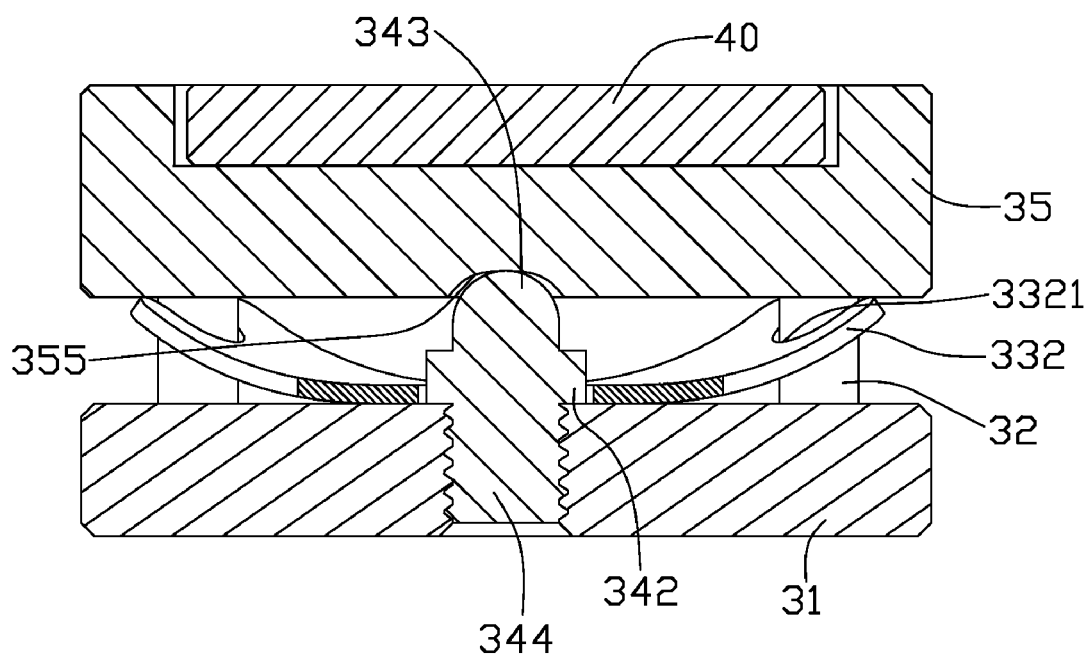
FIG. 3 is a cross-sectional view of the lens holder of FIG. 1 with the lens.

Referring to FIGS. 1 through 3, a lens holder 30 for holding a lens 40 in accordance with a first preferred embodiment of the present invention is shown. The lens holder 30 includes a base 31, three platform supporting members 32, a resilient element 33, a supporting shaft 34, a lens holding platform 35, and two pegs 36. The lens 40 is configured for reflecting light.

The base 31 is substantially a circular plate. A threaded hole 311, three through holes 313, three mounting holes 314, and three cutouts 312 are defined in the base 31. The threaded hole 311 is formed in a center from a top surface of the base 31. In the preferred embodiment the threaded hole 311 is a through hole. The through holes 313 are formed uniformly around (adjacent) the perimeter in the base 31 correspondingly, and the mounting holes 314 are formed at predetermined positions in the base 31. The mounting holes 314 are configured for fastening the lens holder 30 to a machining device via plurality of fastening members. The cutouts 312 are formed around the perimeter in the bottom surface of the base 31 corresponding to the through holes 313. The cutouts 312 communicate with the mounting holes 314 correspondingly.

The platform supporting member 32 includes a column portion 321 and a head portion 322 extended from an end of the column portion 321. The head portion 322 of each platform supporting member 32 is cylindrical in shape, and configured for being partially received in one corresponding cutout 312 of the base 31.

The resilient element 33 includes a circular base plate 331 and three resilient arching petals 332 extended from a rim of the base plate 331. The base plate 33 defines a pivot hole 3311 in a center. The resilient arching petal 332 defines a positioning cutout 3321 in an outer end.

The supporting shaft 34 includes a cylindrical shaft portion 341, and a thread portion 344 is formed at a bottom side of the shaft portion 341. The thread portion 344 is configured for engaging with the threaded hole 311 of the base 31. A flange 342 is formed at a middle portion of the thread portion 344, and a horizontal cross-section of the flange 342 is double-D shaped. A cap 343 is formed at a top side of the thread portion 344, and the cap 343 is spherical in shape. The cap 343 is configured for supporting the center of the lens holding platform 35.

The lens holding platform 35 is substantially a cylinder. The lens holding platform 35 defines a circular depression 354, a blind hole 355, and three threaded holes 351. The circular depression 354 is formed in a center from a top surface of the lens holding platform 35, and configured for receiving the lens 40. The blind hole 355 is formed in a center from a bottom surface of the lens holding platform 35. The blind hole 355 is configured for pivotally receiving the cap 343. The threaded holes 351 are formed around the perimeter of the lens holding platform 35 corresponding to the through holes 313 of the base 30 correspondingly. Two peg holes 352 are defined in the side of the lens holding platform 35, axes of the peg holes 352 are perpendicular to each other. The peg holes 352 communicate with the circular depression 354. The pegs 36 are cylindrical in shape, and configured for being inserted into the peg hole 352 of the lens holding platform 35.

Referring to FIGS. 1 through 3 again, in assembly of the lens holder 30, the thread portion 344 of the supporting shaft 34 is inserted through the pivot hole 3311 of the resilient element 33 until the flange 342 engages with the pivot hole 3311 of the resilient element 33. The supporting shaft 34, attached with the resilient element 33, is screwed into the threaded hole 341 of the base 31. The platform supporting members 32 is inserted through the through holes 313 of the base 31, the positioning cutout 3321 of the resilient arching petals 332, and screwed into the lens holding platform 35, thereby connecting the lens holding platform 35 to the base 31. After the platform supporting members 32 screwing into the lens holding platform 35, each resilient arching petal 332 resists the lens holding platform 35, and the cap 343 of the supporting shaft 34 is positioned in the blind hole 355 of the lens holding platform 35. Finally, the pegs 36 are partially inserted into the peg holes 352 of the lens holding platform 35 correspondingly. After the lens holder 30 is assembled, the lens 40 is disposed in the circular depression 354 of the lens holding platform 35, and the pegs 36 are fully inserted into the peg holes 352 of the lens holding platform 35, thus, ends of the peg 36 confines the lens 40 in the lens 40 to the lens holding platform 35.

In use, the lens holder 30 can be fixed to the optical manufacturing machine by a plurality of fastening members. Then, the platform supporting members 32 are tightened/loosened to adjust a height of the threaded hole 351 relative to through hole 313, thereby adjusting the gradient of the lens holding platform 35 relative to the base 31. That is, adjusting the platform supporting members 32 to change the gradient of the lens 40 relative to the base 31, thus directing a beam of light emitted from a light source to transmit along a predetermined path. Therefore, the optical manufacturing machine using the lens holder 30 has high machining precision.

Because the base 31 and the lens holding platform 35 are connected by three platform supporting members 32, and the resilient element 33 is positioned between the base 31 and the lens holding platform 35, the gradient of the lens 40 relative to the base 31 can be changed by adjusting a length of the platform supporting members 32 engaged in the lens holding platform 35. Furthermore, the cap 343 of the supporting shaft 34 is received in the blind hole 355 of the lens holding platform 35, and the thread portion 344 of the supporting shaft 34 is screwed into the threaded hole 341 of the base 31, so a distance between a center of the lens holding platform 35 and a center the base 31 can be changed by adjusting a length of the supporting shaft 34 engaged in the base 31. That is, a distance between a center of the lens 40 and the center of the base 31 can be changed by adjusting the supporting shaft 34. After the distance between a center of the lens 40 and the center of the base 31 is adjusted to a predetermined value, the gradient of the lens 40 relative to the base 31 is exactly adjusted to a predetermined value. Therefore, the lens holder 30 has a high adjusting precision.

It should be understood that, the lens holder 30 can have four or more platform supporting members 32, but the platform supporting members 32 cannot be aligned in a straight line. Then, the resilient element 33 correspondingly has four or more resilient arching petals 332. Further, the platform supporting members 32 may be other platform supporting member that can adjust a gradient of the lens holding platform 35 relative to the base 31. When an optical system using the lens holder 30 need a low precision, the lens holder 30 can just have one or two platform supporting member to adjust a gradient of the lens holding platform 35 relative to the base 31, and other platform supporting members are welded to the lens holding platform 35 and the base 31. In addition, the horizontal cross-sections of the flange 342 may be other shapes, such as hexagon. Accordingly, the base plate 331 of the resilient element 33 also defines a hexagonal hole therein.

Figure 4:
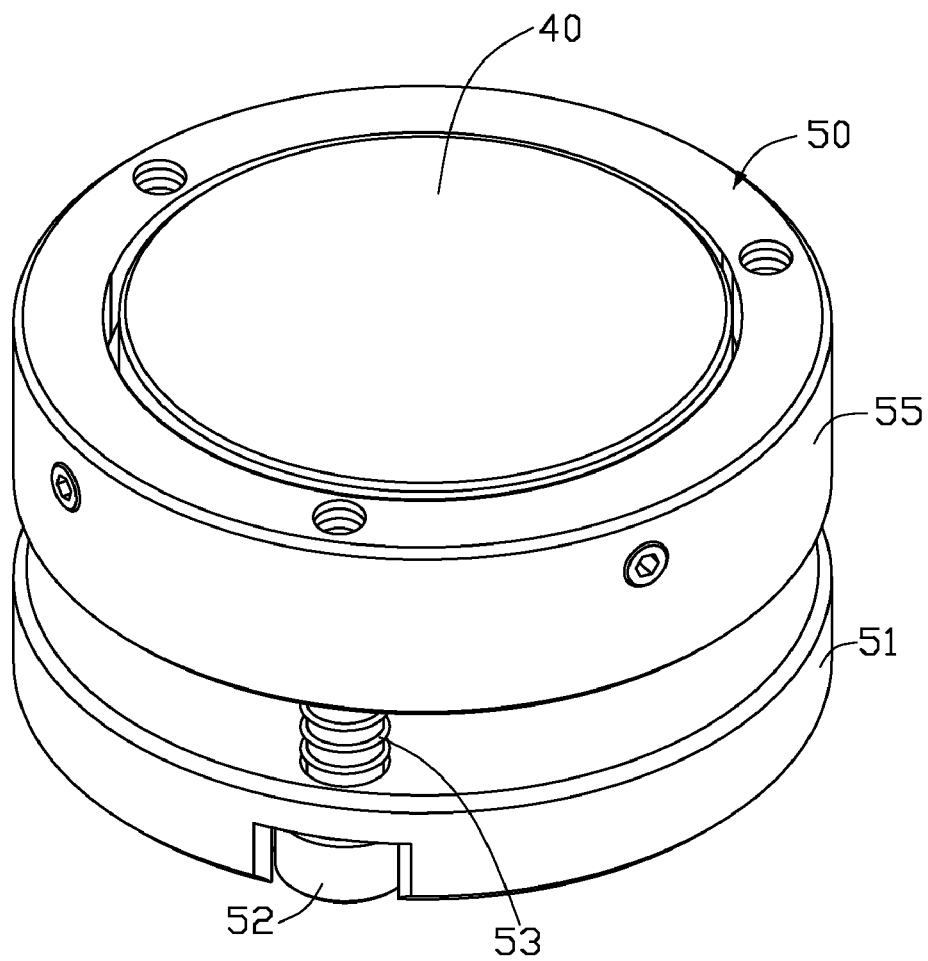
FIG. 4 is an assembled, isometric view of a lens holder in accordance with a second preferred embodiment of the present application with a lens received in the lens holder.
Figure 5:
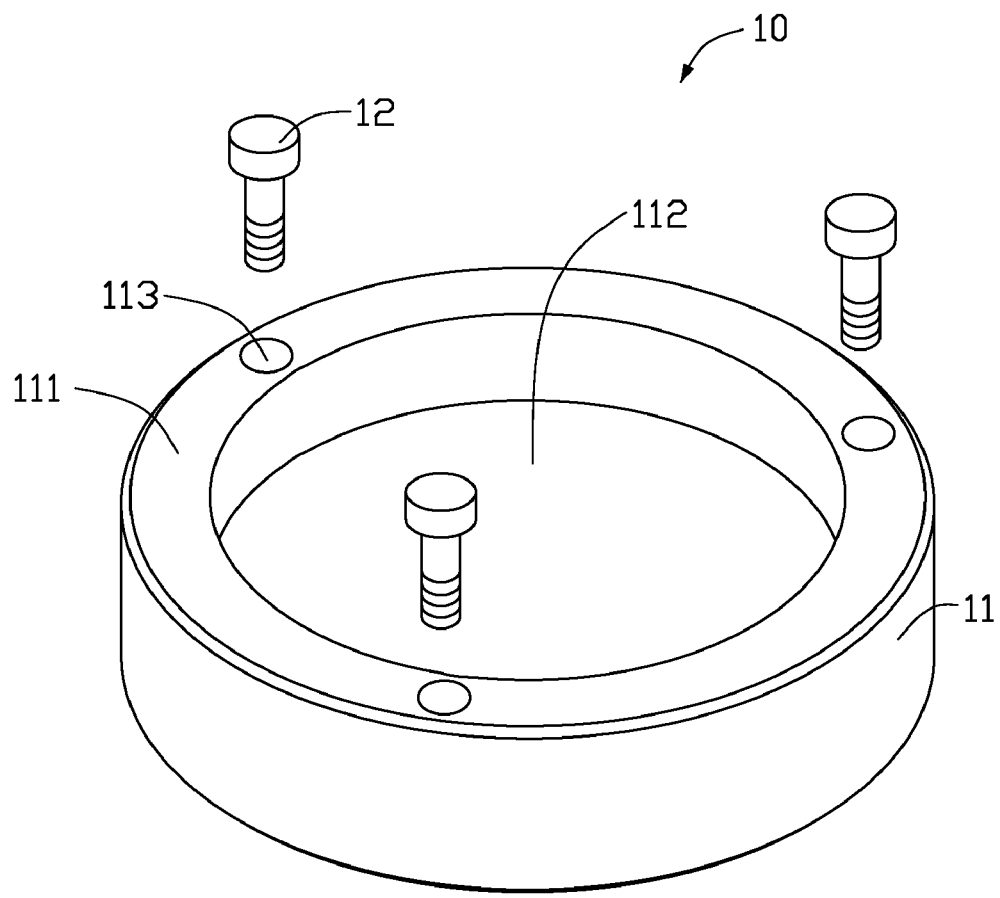
FIG. 5 is an isometric view of a conventional lens holder.

Referring to FIG. 4, a lens holder 50 in accordance with a second preferred embodiment of the present invention is shown. The lens holder 50 is similar in principle to the lens holder 30 of the first preferred embodiment, however the resilient element 33 of the lens holder 30 is replaced by three springs 53. Three platform supporting members 52 are inserted through the three springs 53 correspondingly. A gradient of the lens holding platform 55 relative to the base 51 can be changed by adjusting the platform supporting members 52, that is, adjusting the platform supporting members 52 to change the gradient of the lens 50 relative to the base 51, thus directing a beam of light emitted from a light source to exactly transmit in a predetermined path.

It is believed that the present embodiments and their advantages will be understood from the foregoing description, and it will be apparent that various changes may be made thereto without departing from the spirit and scope of the invention or sacrificing all of its material advantages, the examples hereinbefore described merely being preferred or exemplary embodiments of the invention.

What is claimed is:

1. A lens holder, comprising:
   a lens holding platform;
   a base;
   at least one resilient element positioned between the lens holding platform and the base, the resilient element configured for uniformly resisting the lens holding platform away from the base;
   at least three platform supporting members connecting the lens holding platform with the base; and
   wherein the platform supporting members are aligned on different axes, and at least one of the at least three platform supporting members is adjustable, thus adjusting a gradient of the lens holding platform relative to the base.

2. The lens holder as claimed in claim 1, wherein the lens holder further comprises a supporting shaft, the supporting shaft is fixed to the base and resists the lens holding platform.

3. The lens holder as claimed in claim 2, wherein the supporting shaft comprises a shaft portion, a cap is formed at one end of the shaft portion, the lens holding platform defines a blind hole in a center, and the cap is positioned in the blind hole of the lens holding platform.

4. The lens holder as claimed in claim 3, wherein the supporting shaft further comprises a thread portion at the other end of the shaft portion, and the base defines a mounting hole in a center, the thread portion is partly received in the mounting hole of the base.

5. The lens holder as claimed in claim 2, wherein the at least one resilient element comprises one resilient element, the resilient element comprises a base plate and three resilient arching petal extended from a rim of the base plate.

6. The lens holder as claimed in claim 5, wherein the base plate defines a pivot hole therein, the supporting shaft is extended through the pivot hole of the base.

7. The lens holder as claimed in claim 6, wherein a positioning cutout is defined in an outer end of each resilient arching petal.

8. The lens holder as claimed in claim 1, wherein the resilient element is a spring, the spring is sleeved on the platform supporting member.

9. The lens holder as claimed in claim 1, wherein a plurality of threaded holes are formed around the perimeter of the lens holding platform, a plurality of through holes are defined in the base corresponding to the threaded holes, the platform supporting members are extended through the through holes of the base and screwed into the threaded holes of the lens holding platform correspondingly.

10. The lens holder as claimed in claim 1, wherein the lens holder further comprises at least one peg, a depression for receiving the lens is defined in the lens holding platform, at least one peg hole is defined in the side of the lens holding platform and communicates with the groove, the peg is received in the peg hole of the lens holding platform.

11. The lens holder as claimed in claim 10, wherein the at least one peg hole comprises two peg holes, and axes of the peg holes are perpendicular to each other.

12. The lens holder as claimed in claim 1, wherein at least three platform supporting members comprise three platform supporting members, and each of the platform supporting members is adjustable, thus adjusting a gradient of the lens holding platform relative to the base.

13. The lens holder as claimed in claim 1, wherein the lens holding platform is substantially a cylinder.

* * * * *